US012723522B2

(12) United States Patent
Higuchi et al.

(10) Patent No.: US 12,723,522 B2
(45) Date of Patent: Sep. 1, 2026

(54) COOLING FLUID GUIDE FOR GAS TURBINE AND GAS TURBINE

(71) Applicant: MITSUBISHI HEAVY INDUSTRIES, LTD., Tokyo (JP)

(72) Inventors: Shinichi Higuchi, Tokyo (JP); Takeshi Aso, Tokyo (JP); Yasuhiro Horiuchi, Tokyo (JP); Masaya Kato, Tokyo (JP); Tomoyuki Matsui, Tokyo (JP); Kenji Nanataki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/106,025

(22) PCT Filed: Aug. 9, 2023

(86) PCT No.: PCT/JP2023/029068

§ 371 (c)(1),
(2) Date: Feb. 24, 2025

(87) PCT Pub. No.: WO2024/053326

PCT Pub. Date: Mar. 14, 2024

(65) Prior Publication Data

US 2026/0063050 A1 Mar. 5, 2026

(30) Foreign Application Priority Data

Sep. 5, 2022 (JP) ................................ 2022-140481

(51) Int. Cl.
*F01D 25/14* (2006.01)
*F01D 9/04* (2006.01)
(Continued)

(52) U.S. Cl.
CPC ............ *F01D 25/14* (2013.01); *F01D 9/042* (2013.01); *F01D 9/06* (2013.01); *F01D 25/24* (2013.01);
(Continued)

(58) Field of Classification Search
CPC .......... F01D 11/24; F01D 25/08; F01D 25/12; F01D 25/14; F01D 25/24; F01D 9/02; F01D 9/04; F01D 9/042
See application file for complete search history.

(56) References Cited

U.S. PATENT DOCUMENTS 3,300,178 A * 1/1967 Rizk ...................... F01D 25/14 415/117
3,864,056 A * 2/1975 Gabriel .................. F01D 9/041 415/177
(Continued)

FOREIGN PATENT DOCUMENTS

CA 1 125 660 6/1982
JP 61-17401 1/1986
(Continued)

OTHER PUBLICATIONS

International Search Report issued Oct. 17, 2023 in International Application No. PCT/JP2023/029068, with English translation.
(Continued)

*Primary Examiner* — Alain Chau
(74) *Attorney, Agent, or Firm* — Wenderoth, Lind & Ponack, L.L.P.

(57) ABSTRACT

The present invention provides a cooling fluid guide for a gas turbine, the cooling fluid guide comprising: a fixed part to be fixed either to piping for supplying a cooling fluid to a cooling fluid supply hole in a turbine casing or to the turbine casing; and a first guide part configured to cover at least a portion of the cooling fluid supply hole when viewed
(Continued)

along the axial direction of the cooling fluid supply hole from the inside of the gas turbine in the radial direction in a state in which the fixed part is fixed to the piping or the turbine casing.

7 Claims, 5 Drawing Sheets

(51) Int. Cl.
*F01D 9/06* (2006.01)
*F01D 25/24* (2006.01)
*F02C 7/18* (2006.01)

(52) U.S. Cl.
CPC .............. *F01D 9/041* (2013.01); *F01D 9/065* (2013.01); *F01D 25/243* (2013.01); *F02C 7/18* (2013.01); *F05D 2240/12* (2013.01); *F05D 2240/14* (2013.01); *F05D 2260/20* (2013.01)

(56) References Cited

U.S. PATENT DOCUMENTS 5,165,847 A * 11/1992 Proctor ................... F01D 11/08 415/115
5,772,400 A * 6/1998 Pellow .................... F01D 11/24 415/173.1
5,964,575 A * 10/1999 Marey ..................... F01D 25/12 415/173.1
6,929,445 B2 * 8/2005 Zatorski .................. F01D 5/188 415/115
7,008,183 B2 * 3/2006 Sayegh ................... F01D 25/12 415/196
7,108,479 B2 * 9/2006 Beverley ................... F01D 9/06 415/115
7,670,108 B2 * 3/2010 Liang .................... F01D 11/008 415/173.1
8,100,633 B2 * 1/2012 Propheter-Hinckley ..................... F01D 9/065 415/176
9,920,643 B2 * 3/2018 Manzoori ............... F01D 9/065
9,926,789 B2 * 3/2018 Hagan ..................... F01D 25/12
9,927,123 B2 * 3/2018 Hagan ....................... F23R 3/26
10,422,237 B2 * 9/2019 McDavid ................ F01D 25/14
10,422,244 B2 * 9/2019 Shapiro ..................... F01D 9/04
11,698,005 B2 * 7/2023 Tu ............................. F02C 7/18 415/208.1
2002/0098079 A1 * 7/2002 Fujikawa ................ F01D 11/08 415/176
2005/0141989 A1 * 6/2005 Sayegh ..................... F01D 9/04 415/116
2009/0232637 A1 9/2009 Propheter-Hinckley et al.
2011/0255989 A1 * 10/2011 Koyabu .................. F01D 11/24 416/97 R
2013/0283814 A1 10/2013 Johns et al.
2018/0291754 A1 * 10/2018 McDavid ................ F01D 25/14
2018/0340468 A1 11/2018 Takamura et al.
2019/0195077 A1 6/2019 Guevel et al.
2022/0316352 A1 * 10/2022 Yazici ....................... F01D 9/06

FOREIGN PATENT DOCUMENTS

JP 2005-240573 9/2005
JP 2013-227974 11/2013
JP WO2017/090709 6/2017

OTHER PUBLICATIONS

International Preliminary Report on Patentability issued Mar. 20, 2025 in International Application No. PCT/JP2023/029068, with English translation.

* cited by examiner 2
4
6
8
9
10
12
16

FIG. 2

COOLING FLUID GUIDE FOR GAS TURBINE AND GAS TURBINE

TECHNICAL FIELD

The present disclosure relates to a gas turbine cooling fluid guide and a gas turbine.

The present application claims priority based on Japanese Patent Application No. 2022-140481 filed in the Japan Patent Office on Sep. 5, 2022, the contents of which are incorporated herein by reference.

BACKGROUND ART

PTL 1 discloses that, in order to cool a gas turbine stator vane, a cooling fluid is supplied from a cooling fluid supply hole provided in a turbine casing to an outer cavity formed between an outer shroud of the gas turbine stator vane and the turbine casing.

CITATION LIST

Patent Literature

[PTL 1] International Publication No. WO2017/090709

SUMMARY OF INVENTION

Technical Problem

In a case where the cooling fluid is supplied from the cooling fluid supply hole provided in the turbine casing to the gas turbine stator vane, a variation in the amount of cooling fluid supplied occurs between a gas turbine stator vane located in the vicinity of the cooling fluid supply hole and a gas turbine stator vane located far from the cooling fluid supply hole, and a variation in the cooling effect of the gas turbine stator vane occurs between the plurality of gas turbine stator vanes.

In view of the above circumstances, an object of at least one embodiment of the present disclosure is to provide a gas turbine cooling fluid guide that can suppress a variation in a cooling effect by a cooling fluid between a plurality of gas turbine stator vanes and a gas turbine including the gas turbine cooling fluid guide.

Solution to Problem

In order to achieve the above object, according to at least one embodiment of the present disclosure, there is provided a gas turbine cooling fluid guide for guiding a cooling fluid of a gas turbine, the gas turbine including a plurality of turbine stator vanes and a turbine casing which accommodates the plurality of turbine stator vanes and in which a cooling fluid supply hole for supplying the cooling fluid to the plurality of turbine stator vanes is formed, the gas turbine cooling fluid guide including: a fixed portion that is fixed to either a pipe for supplying the cooling fluid to the cooling fluid supply hole or the turbine casing; and a first guide portion that is configured to cover at least a portion of the cooling fluid supply hole when viewed from an inside of the gas turbine in a radial direction along a direction of an axis line of the cooling fluid supply hole in a state in which the fixed portion is fixed to the pipe or the turbine casing.

In order to achieve the above object, according to at least one embodiment of the present disclosure, there is provided a gas turbine including: the gas turbine cooling fluid guide; the turbine casing; and the plurality of turbine stator vanes.

Advantageous Effects of Invention

According to at least one embodiment of the present disclosure, it is possible to provide a gas turbine cooling fluid guide that can suppress a variation in a cooling effect by a cooling fluid between a plurality of gas turbine stator vanes and a gas turbine including the gas turbine cooling fluid guide.

BRIEF DESCRIPTION OF DRAWINGS

FIG. 2 is a schematic cross-sectional view showing an example of a cross section orthogonal to an axial direction in a turbine casing 10.

DESCRIPTION OF EMBODIMENTS

Figure 1:
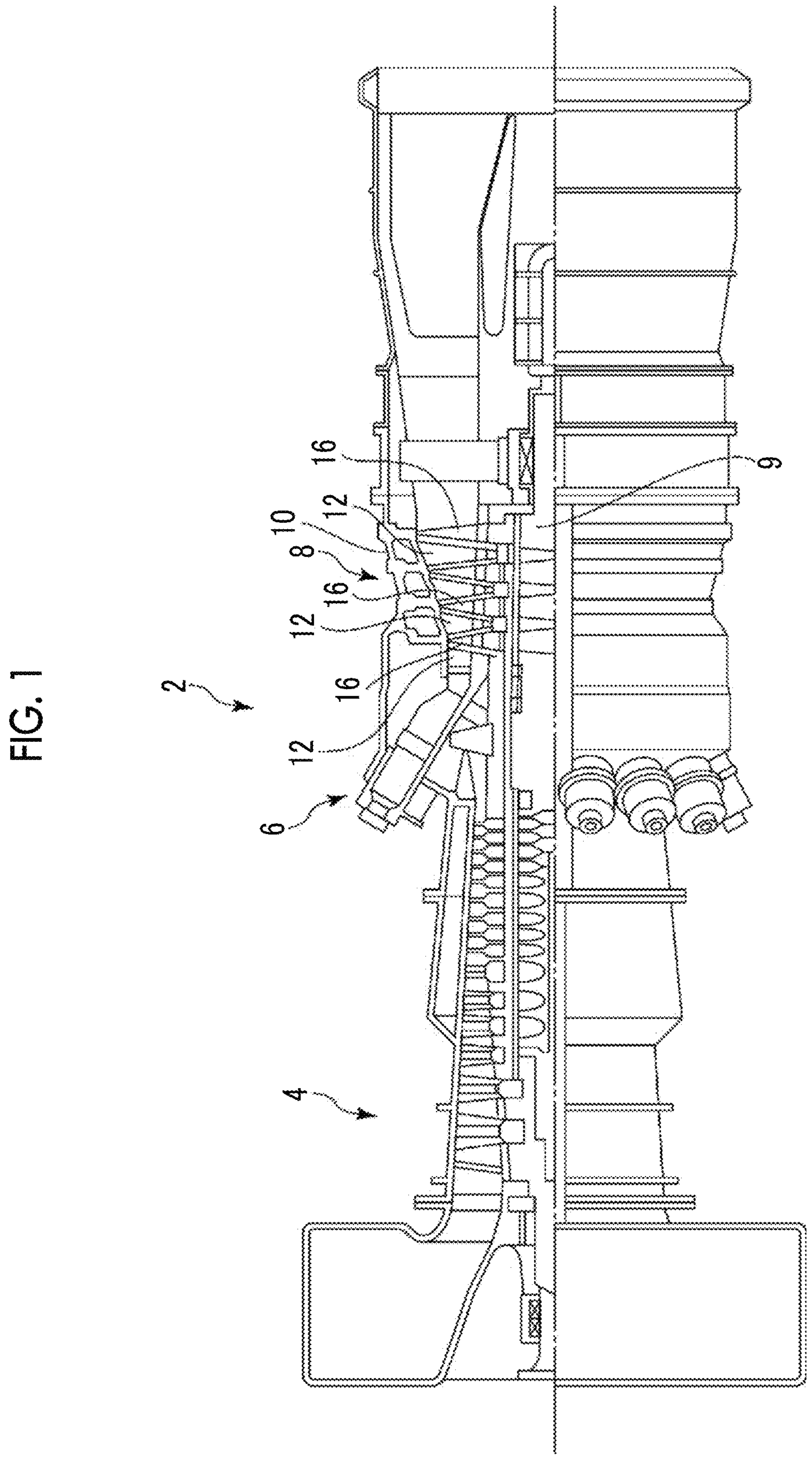
FIG. 1 is a diagram showing a schematic configuration of a gas turbine 2 according to an embodiment.

Hereinafter, some embodiments of the present disclosure will be described with reference to the accompanying drawings. Dimensions, materials, shapes, relative dispositions, and the like of components described as embodiments or shown in the drawings are not intended to limit the scope of the invention, but are merely explanatory examples.

For example, it is assumed that, strictly speaking, an expression representing relative or absolute disposition, such as “in a certain direction”, “along a certain direction”, “parallel”, “orthogonal”, “center”, “concentric”, or “coaxial”, not only represents the disposition, but also represents a state of relative displacement with a tolerance or a sufficient angle or distance to obtain the same function.

For example, it is assumed that, strictly speaking, expressions, such as identical”, “equal”, and “homogeneous”, representing that things are in an equal state not only represent the equal state, but also represent a state in which there is a tolerance or a sufficient difference to obtain the same function.

For example, it is assumed that an expression representing a shape, such as a quadrangular shape or a cylindrical shape, not only represents a shape, such as a quadrangular shape or a cylindrical shape, in a geometrically strict sense, but also represents a shape including an uneven portion, a chamfered portion, or the like within a range in which the same effect is obtained.

Meanwhile, an expression “being provided with”, “being equipped with”, “comprising”, “including”, or “having” one component is not an exclusive expression that excludes the presence of other components.

FIG. 1 is a diagram showing a schematic configuration of a gas turbine 2 according to an embodiment.

As shown in FIG. 1, the gas turbine 2 includes a compressor 4, a combustor 6 that mixes compressed air generated by the compressor 4 with fuel and combusts the mixture, and a turbine 8 for obtaining power from combustion gas generated by the combustor 6.

As shown in FIG. 1, the turbine 8 includes a rotor 9 (turbine rotor), a turbine casing 10, a plurality of turbine stator vanes 12 (gas turbine stator vanes) that are fixed to an inner surface of the turbine casing 10, and a plurality of turbine rotor blades 16 that are implanted in the rotor 9 to be alternately arranged in an axial direction with respect to the turbine stator vanes 12. The turbine casing 10 accommodates the rotor 9, the plurality of turbine stator vanes 12, and the plurality of turbine rotor blades 16. Each stage of the turbine 8 includes a plurality of turbine stator vanes 12 that are arranged along a circumferential direction of the gas turbine 2 and a plurality of turbine rotor blades 16 that are arranged along the circumferential direction of the gas turbine 2 on a downstream side of the plurality of turbine stator vanes 12.

Hereinafter, the "circumferential direction" means a circumferential direction of the gas turbine 2, that is, a circumferential direction of the rotor 9 unless otherwise specified, the "axial direction" means an axial direction of the gas turbine 2, that is, an axial direction of the rotor 9 unless otherwise specified, and the "radial direction" means a radial direction of the gas turbine 2, that is, a radial direction of the rotor 9 unless otherwise specified.

Figure 2:
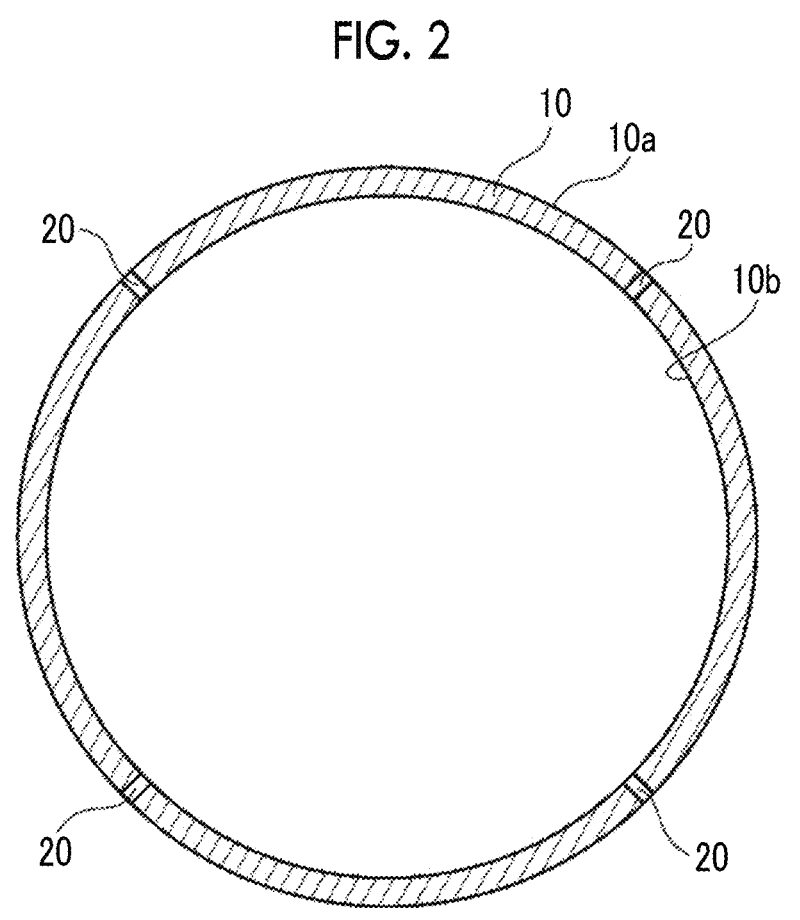

FIG. 2 is a schematic cross-sectional view showing an example of a cross section orthogonal to the axial direction in the turbine casing 10.

As shown in FIG. 2, a plurality of cooling fluid supply holes 20 for supplying a cooling fluid to the plurality of turbine stator vanes 12 (see FIG. 1) are formed in the turbine casing 10. The plurality of cooling fluid supply holes 20 are provided at intervals in the circumferential direction. In the example shown in FIG. 2, four cooling fluid supply holes 20 are provided at equal intervals in the circumferential direction, and each of the cooling fluid supply holes 20 is a through-hole that penetrates an outer surface 10*a* and an inner surface 10*b* of the turbine casing 10 in the radial direction.

Figure 3:
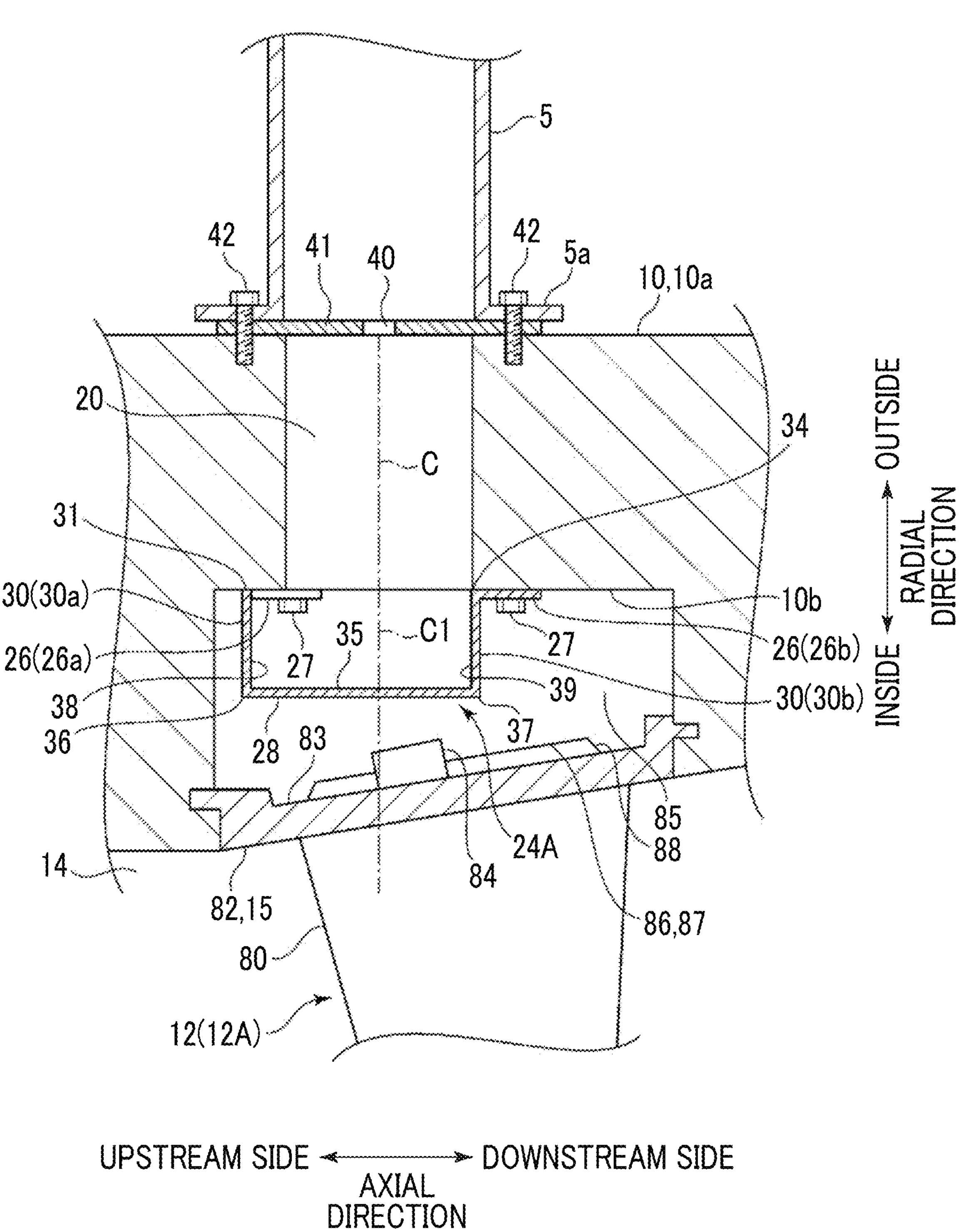
FIG. 3 is a schematic cross-sectional view showing an example of a portion of a cross section along an axial direction at a position of each cooling fluid supply hole 20 in the gas turbine 2.

FIG. 3 is a schematic cross-sectional view showing an example of a portion of a cross section along the axial direction at a position of each of the cooling fluid supply holes 20 in the gas turbine 2. In addition, since the cross sections along the axial direction at the positions of the cooling fluid supply holes 20 in the gas turbine 2 are essentially the same, the cross section along the axial direction at the position of one cooling fluid supply hole 20 in the gas turbine 2 will be described below.

As shown in FIG. 3, a pipe 5 for supplying the cooling fluid to the cooling fluid supply hole 20 is connected to the turbine casing 10. In the example shown in FIG. 3, a flange 5*a* is fixed to the outer surface 10*a* of the turbine casing 10 by fixing members 42, such as bolts, in a state in which an orifice plate 41 in which an orifice 40 having a smaller diameter than each of the inner diameter of the pipe 5 and the diameter of the cooling fluid supply hole 20 is formed is interposed between the flange 5*a* formed at one end of the pipe 5 and the outer surface 10*a* of the turbine casing 10. In the example shown in FIG. 3, the orifice 40 is located on an extension line of an axis line C of the cooling fluid supply hole 20.

As shown in FIG. 3, each of the plurality of turbine stator vanes 12 includes an airfoil portion 80, an outer shroud 82, a seal tube 84, and a heat shield plate 86. In addition, in the example shown in FIG. 3, the gas turbine 2 includes a gas turbine cooling fluid guide 24A.

The airfoil portion 80 has an airfoil cross-sectional shape defined by a pressure surface and a suction surface. The outer shroud 82 is connected to an outer end of the airfoil portion 80 in a blade height direction and is formed in a substantially plate shape along a plane intersecting the radial direction. The outer shroud 82 forms an outer peripheral wall 15 of a flow path 14 for combustion gas in the turbine 8 (a flow path of a main flow of the combustion gas in the turbine 8). The turbine stator vane 12 includes an inner shroud (not shown) that is connected to an inner end of the airfoil portion 80 in the blade height direction. The inner shroud is formed in a substantially plate shape along the plane intersecting the radial direction and forms an inner peripheral wall of the flow path 14. In addition, in the present specification, the "upstream side in the axial direction" means an upstream side of the main flow of the combustion gas of the turbine 8 (the flow of the combustion gas through the flow path 14) in the axial direction, and the "downstream side in the axial direction" means a downstream side of the main flow of the combustion gas of the turbine 8 (the flow of the combustion gas through the flow path 14) in the axial direction.

The seal tube 84 is disposed in an internal passage (not shown) of the airfoil portion 80 and is configured in a tube shape. The seal tube 84 is configured to guide air in an outer cavity 85 that is formed between the outer shroud 82 and the turbine casing 10 to the inside of the turbine stator vane 12 through the inside of the airfoil portion 80.

The compressed air from the compressor 4 is supplied as cooling air to the outer cavity 85 through the cooling fluid supply hole 20, and the cooling air that has flowed into the seal tube 84 from the outer cavity 85 is guided to the inside of the turbine stator vane 12 in the radial direction, is supplied to an inter-stage space (not shown) between the turbine stator vane 12 and the turbine rotor blade 16 (see FIG. 1) adjacent to the upstream side of the turbine stator vane 12, and further functions as cooling air.

The heat shield plate 86 is attached as an accessory component of the turbine stator vane 12 to an outer surface 83 of the outer shroud 82 in the radial direction. The heat shield plate 86 is provided to cover at least a portion of the outer surface 83 of the outer shroud 82. In the example shown in FIG. 3, the heat shield plate 86 includes a top plate portion 87 that has a plate shape and that is disposed parallel to the surface 83, with a gap between the top plate portion 87 and the surface 83 in the blade height direction, and a side wall portion 88 that is connected to a peripheral edge of the top plate portion 87 and that is provided to surround the seal tube 84. The side wall portion 88 is fixed to the surface 83 of the outer shroud 82 by, for example, welding or the like.

Figure 4:
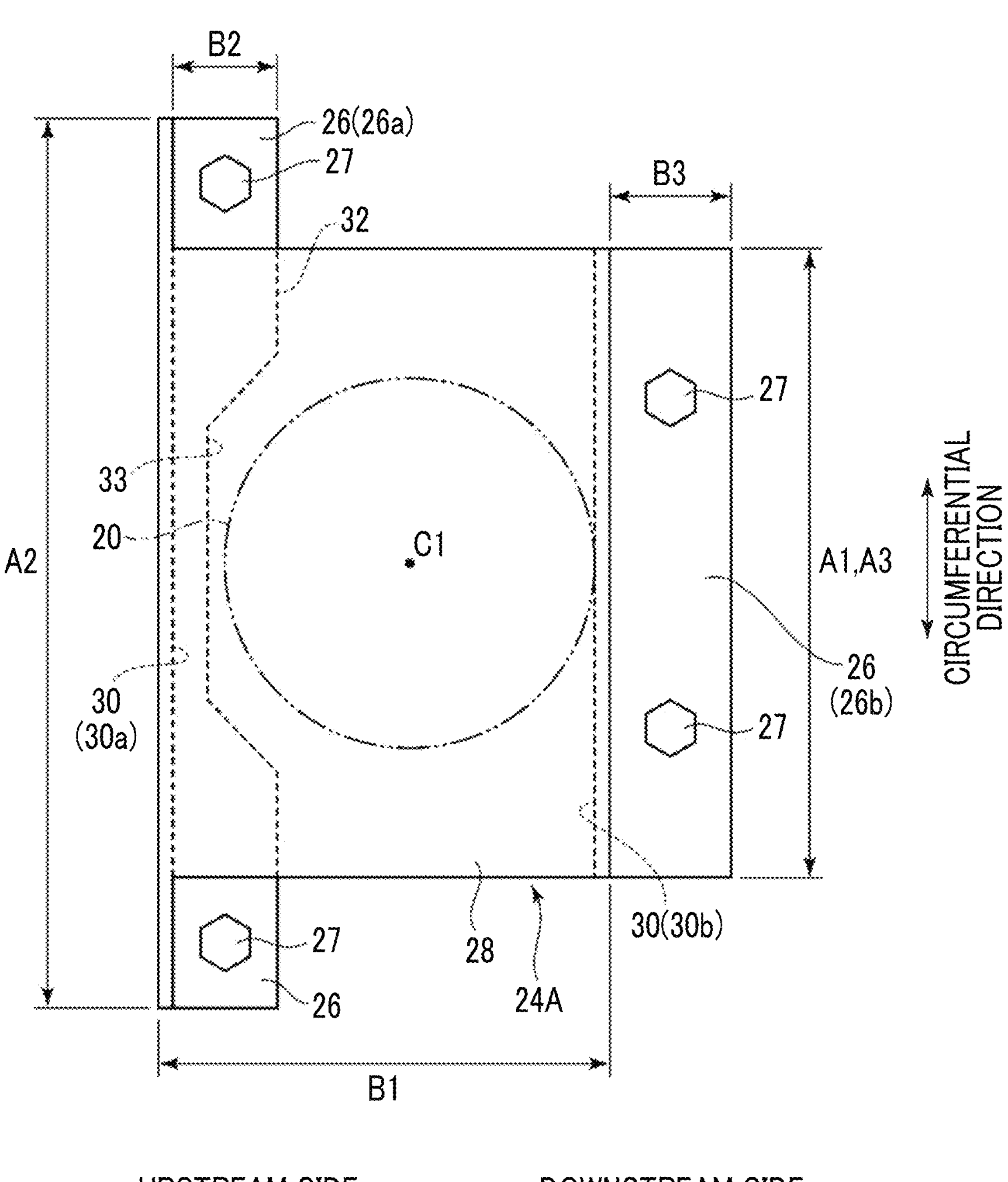
FIG. 4 is a view showing a gas turbine cooling fluid guide 24A shown in FIG. 3 as viewed from an inside in a radial direction along an axis line C of the cooling fluid supply hole 20.

FIG. 4 is a view showing the gas turbine cooling fluid guide 24A shown in FIG. 3 as viewed from the inside in the radial direction along the axis line C of the cooling fluid supply hole 20.

In some embodiments, for example, as shown in FIGS. 3 and 4, the gas turbine 2 includes the gas turbine cooling fluid guide 24A for guiding the cooling fluid of the gas turbine 2. The gas turbine cooling fluid guide 24A is provided for each cooling fluid supply hole 20. The gas turbine cooling fluid guide 24A includes a plurality of fixed portions 26, a first guide portion 28 (baffle plate), and a plurality of second guide portions 30 (a plurality of side plates). In the example shown in FIG. 4, each of the plurality of fixed portions 26, the first guide portion 28, and each of the plurality of second guide portions 30 is formed in a plate shape having a substantially quadrangular cross section. In addition, the cooling fluid supply hole 20 has a circular cross-sectional shape. The first guide portion 28 is located inside fixed portions 26*a* and 26*b* in the radial direction.

In the example shown in FIG. 4, the plurality of fixed portions 26 include two fixed portions 26*a* and 26*b*, and the plurality of second guide portions 30 include two second guide portions 30*a* and 30*b* (an upstream-side second guide portion and a downstream-side second guide portion). Each of the plate-shaped fixed portions 26*a* and 26*b* is disposed along the inner surface 10*b* of the turbine casing 10 and is fixed to the inner surface 10*b* of the turbine casing 10 by fixing members 27 such as bolts. The fixed portion 26*a* is provided on the upstream side of the cooling fluid supply hole 20 in the axial direction, and the fixed portion 26*b* is provided on the downstream side of the cooling fluid supply hole 20 in the axial direction.

For example, as shown in FIG. 3, the fixed portion 26*a* is connected to an outer end portion 31 (outer end) of the second guide portion 30*a* in the radial direction and protrudes from the end portion 31 to the downstream side in the axial direction. For example, as shown in FIG. 4, a cutout-shaped recess portion 33 that is recessed toward the upstream side in the axial direction is formed at an end edge 32 of the fixed portion 26 on the downstream side in the axial direction, and a portion of the cooling fluid supply hole 20 is located inside the recess portion 33 as viewed from the radial direction. The fixed portion 26*a* is fixed to the inner surface 10*b* (see FIG. 3) of the turbine casing 10 by the fixing members 27 on both sides in the circumferential direction with the first guide portion 28 interposed therebetween as viewed from the radial direction.

For example, as shown in FIG. 3, the fixed portion 26*b* is connected to an outer end portion 34 (outer end) of the second guide portion 30*b* in the radial direction and protrudes from the end portion 34 to the downstream side in the axial direction. For example, as shown in FIG. 4, the fixed portion 26*b* is fixed to the inner surface 10*b* (see FIG. 3) of the turbine casing 10 by the fixing members 27 on both sides with a central position of the fixed portion 26*b* in the circumferential direction interposed therebetween.

In the exemplary form shown in FIG. 4, a dimension A2 of the fixed portion 26*a* in the circumferential direction is larger than a dimension A1 of the first guide portion 28 in the circumferential direction and is larger than a diameter R of the cooling fluid supply hole 20. In addition, a dimension A3 of the fixed portion 26*b* in the circumferential direction is equal to the dimension A1 of the first guide portion 28 in the circumferential direction and is larger than the diameter R of the cooling fluid supply hole 20. Further, a dimension B2 of the fixed portion 26*a* in the axial direction is smaller than a dimension B1 of the first guide portion 28 in the axial direction and is smaller than the diameter R of the cooling fluid supply hole 20. Furthermore, a dimension B3 of the fixed portion 26*b* in the axial direction is smaller than the dimension Bl of the first guide portion 28 in the axial direction and is smaller than the diameter R of the cooling fluid supply hole 20.

For example, as shown in FIG. 4, in a case where the first guide portion 28 is viewed from the inside in the radial direction along the direction of the axis line of the cooling fluid supply hole 20 (that is, along an extension line C1 of the axis line C of the cooling fluid supply hole 20), the first guide portion 28 is provided to cover at least a portion of the cooling fluid supply hole 20 (in the example shown in FIG. 4, all of the cooling fluid supply hole 20). That is, in a case where the first guide portion 28 is viewed from the inside in the radial direction along the direction of the axis line of the cooling fluid supply hole 20, the first guide portion 28 is provided to overlap at least a portion of the cooling fluid supply hole 20 (in the example shown in FIG. 4, all of the cooling fluid supply hole 20). The first guide portion 28 is located on the extension line C1 of the axis line C of the cooling fluid supply hole 20 and includes a surface 35 intersecting the extension line C1 (in the example shown in FIG. 4, the surface 35 orthogonal to the extension line C1). The first guide portion 28 is provided to guide at least a portion of the cooling fluid that has passed through the cooling fluid supply hole 20 along the surface 35 intersecting the extension line C1.

For example, as shown in FIG. 3, the plurality of turbine stator vanes 12 of the gas turbine 2 include a turbine stator vane 12A (on-extension-line turbine stator vane) provided on the extension line C1 of the axis line C of the cooling fluid supply hole 20, and the first guide portion 28 is located between the turbine stator vane 12A and the cooling fluid supply hole 20 on the extension line C1. In addition, the first guide portion 28 is located between the heat shield plate 86 of the turbine stator vane 12A and the cooling fluid supply hole 20.

For example, as shown in FIG. 3, the second guide portion 30*a* is formed in a plate shape including a surface 38 intersecting the axial direction (in the example shown in FIG. 3, a surface orthogonal to the axial direction) and is provided to extend outward in the radial direction from an upstream-side end portion 36 (upstream end) of the first guide portion 28 in the axial direction to the fixed portion 26*a*. In the example shown in FIG. 3, the second guide portion 30*a* is connected to an upstream-side end portion (upstream end) of the fixed portion 26*a* in the axial direction. The second guide portion 30*a* is provided to guide at least a portion of the cooling fluid that has passed through the cooling fluid supply hole 20 along the surface 38 intersecting the axial direction.

For example, as shown in FIG. 3, the second guide portion 30*b* is formed in a plate shape including a surface 39 intersecting the axial direction (in the example shown in FIG. 3, a surface orthogonal to the axial direction) and is provided to extend outward in the radial direction from a downstream-side end portion 37 (downstream end) of the first guide portion 28 in the axial direction to the fixed portion 26*b*. In the example shown in FIG. 3, the second guide portion 30*b* is connected to an upstream-side end portion (upstream end) of the fixed portion 26*b* in the axial direction. The second guide portion 30*b* is provided to guide at least a portion of the cooling fluid that has passed through the cooling fluid supply hole 20 along the surface 39 intersecting the axial direction.

Hereinafter, some effects of the gas turbine cooling fluid guide 24A will be described.

In the configuration shown in FIG. 3 and the like, the cooling fluid supplied from the pipe 5 to the cooling fluid supply hole 20 flows along the direction of the axis line of the cooling fluid supply hole 20 and hits the first guide portion 28 of the gas turbine cooling fluid guide 24A such that the direction of the flow is changed to a direction intersecting the axis line C of the cooling fluid supply hole 20. The cooling fluid is guided along the surface 35 of the first guide portion 28. Therefore, it is possible to suppress the concentration of the cooling effect by the cooling fluid on the turbine stator vane 12 (particularly, the turbine stator vane 12A located on the extension line C1 of the axis line C of the cooling fluid supply hole 20) in the vicinity of the cooling fluid supply hole 20 and to suppress a variation in the cooling effect by the cooling fluid between the plurality of turbine stator vanes 12.

In addition, in the configuration shown in FIG. 3 and the like, the cooling fluid that has passed through the cooling fluid supply hole 20 and that has hit the first guide portion 28 can be guided to flow in the circumferential direction between the surface 38 of the second guide portion 30*a* that intersects the axial direction and the surface 39 of the second guide portion 30*b* that intersects the axial direction. Therefore, it is possible to suppress the concentration of the cooling effect by the cooling fluid on the turbine stator vane 12 (particularly, the turbine stator vane 12A located on the extension line C1 of the axis line C of the cooling fluid supply hole 20) in the vicinity of the cooling fluid supply hole 20 and to effectively suppress a variation in the cooling effect by the cooling fluid between the plurality of turbine stator vanes 12.

Further, according to the findings of the present inventors, in a case where the heat shield plate 86 (an accessory component of the turbine stator vane 12A) of the turbine stator vane 12A is attached to the outer surface 83 of the outer shroud 82 in the radial direction, when the cooling fluid that has passed through the cooling fluid supply hole 20 collides with the heat shield plate 86, a large fluid force and fluid vibration act on the heat shield plate 86, and resonance may occur depending on the conditions. As a result, the heat shield plate 86 may be damaged. In this respect, as described above, since the first guide portion 28 is located between the heat shield plate 86 of the turbine stator vane 12A and the cooling fluid supply hole 20, it is possible to suppress the collision of the cooling fluid, which has passed through the cooling fluid supply hole 20, with the heat shield plate 86 of the turbine stator vane 12 on the extension line C1 and to suppress the damage to the heat shield plate 86 caused by the action of the large fluid force and fluid vibration on the heat shield plate 86.

Further, in a case where the gas turbine cooling fluid guide is directly fixed to the turbine stator vane 12 on the extension line C1 instead of to the turbine casing 10, even when the collision of the cooling fluid, which has passed through the cooling fluid supply hole 20, with the heat shield plate 86 of the turbine stator vane 12A on the extension line C1 is suppressed by the gas turbine cooling fluid guide, the vibration of the gas turbine cooling fluid guide 24A is directly transmitted to the turbine stator vane 12A on the extension line C1. Therefore, there is a concern that the heat shield plate 86 will be damaged due to the vibration.

In contrast, in the above-described embodiment, the fixed portions 26*a* and 26*b* of the gas turbine cooling fluid guide 24A are fixed to the turbine casing 10 instead of to the turbine stator vane 12. Therefore, even in a case where the cooling fluid from the cooling fluid supply hole 20 (the cooling fluid from the orifice 40) collides with the gas turbine cooling fluid guide 24A, the transmission of a vibration to the heat shield plate 86 is suppressed, and it is possible to effectively reduce the risk of damage to the heat shield plate 86 caused by the vibration.

Figure 5:
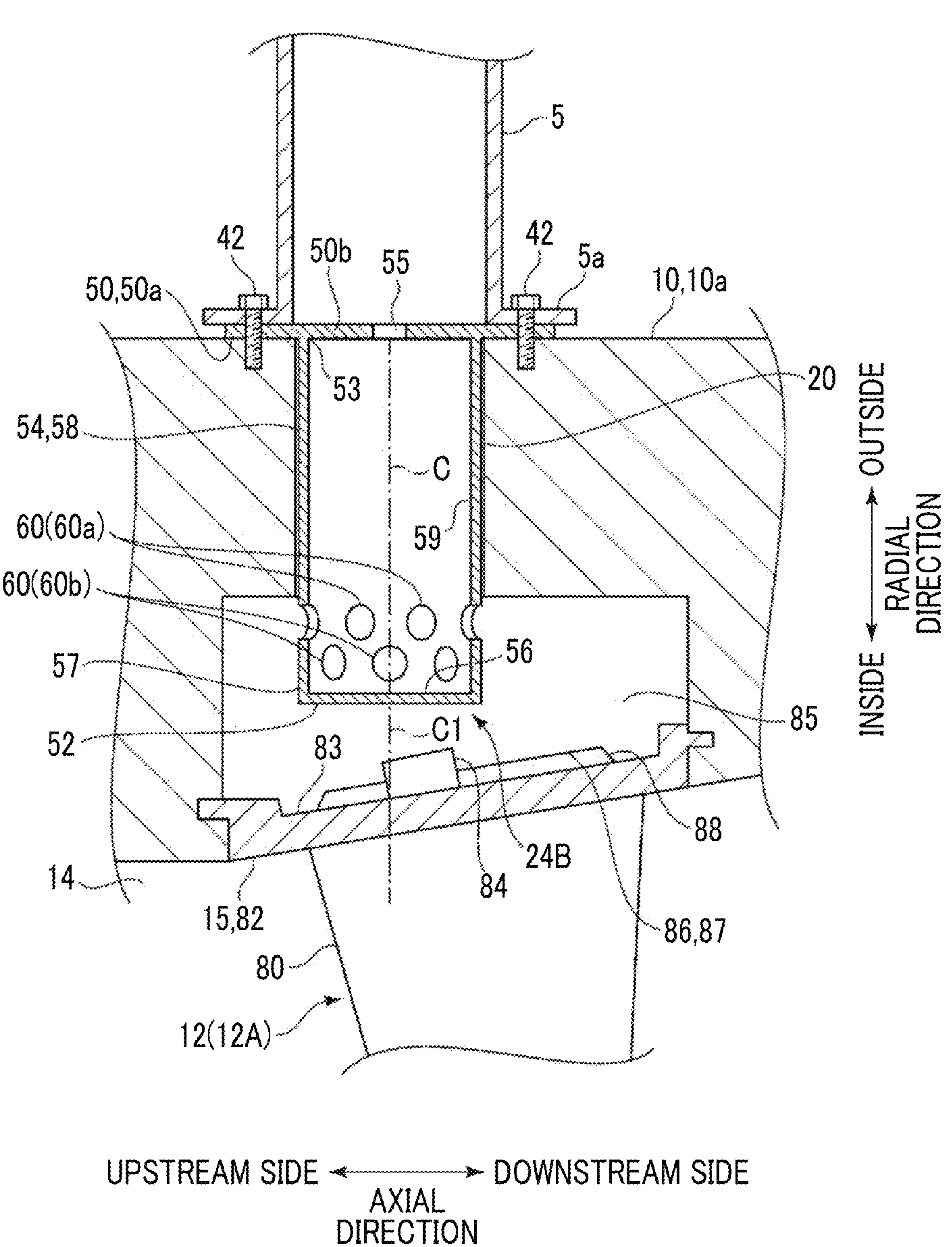
FIG. 5 is a schematic cross-sectional view showing another example of a portion of the cross section along the axial direction at the position of each cooling fluid supply hole 20 in the gas turbine 2.

FIG. 5 is a schematic cross-sectional view showing another example of a portion of the cross section along the axial direction at the position of each cooling fluid supply hole 20 in the gas turbine 2. In addition, since the cross sections along the axial direction at the positions of the cooling fluid supply holes 20 in the gas turbine 2 are essentially the same, the cross section along the axial direction at the position of one cooling fluid supply hole 20 in the gas turbine 2 will be described below.

In the embodiment shown in FIG. 5, since the configuration of the turbine stator vane 12 is the same as the configuration of the turbine stator vane 12 shown in FIG. 3, a description thereof will be omitted. The gas turbine 2 shown in FIG. 5 includes a gas turbine cooling fluid guide 24B for guiding the cooling fluid of the gas turbine 2 instead of the gas turbine cooling fluid guide 24A shown in FIG. 3. The gas turbine cooling fluid guide 24B is provided for each cooling fluid supply hole 20.

As shown in FIG. 5, the pipe 5 for supplying the cooling fluid to the cooling fluid supply hole 20 is connected to the turbine casing 10.

In the example shown in FIG. 5, the gas turbine cooling fluid guide 24B includes a fixed portion 50, a first guide portion 52 (baffle plate), and a second guide portion 54 (porous cylinder). In the example shown in FIG. 5, the fixed portion 50 is formed in a disk shape, the first guide portion 52 is formed in a disk shape, and the second guide portion 54 is formed in a cylindrical shape.

The fixed portion 50 is a disk-shaped flange connected to an outer end portion 53 of the second guide portion 54 in the radial direction and includes an outer-peripheral-side flange portion 50*a* that protrudes from the end portion 53 of the second guide portion 54 to an outer peripheral side (a side opposite to the axis line C of the cooling fluid supply hole 20) of the second guide portion 54 and an inner-peripheral-side flange portion 50*b* that protrudes from the end portion 53 of the second guide portion 54 to an inner peripheral side (a side closer to the axis line C of the cooling fluid supply hole 20) of the second guide portion 54. The outer-peripheral-side flange portion 50*a* is fixed to the flange 5*a* of the pipe 5 and to the turbine casing 10 by the fixing members 42, such as bolts, in a state in which it is interposed between the flange 5*a* formed at one end of the pipe 5 and the outer surface 10*a* of the turbine casing 10. An orifice 55 that has a smaller diameter than each cooling fluid supply hole 20 is formed in the inner-peripheral-side flange portion 50*b*. The orifice 55 is located on an extension line C1 of the axis line C of the cooling fluid supply hole 20.

The first guide portion 52 has a disk shape as described above, is connected to an inner end portion 57 of the second guide portion 54 in the radial direction, and is configured as a bottom plate that closes one end side of the cylindrical second guide portion 54. The first guide portion 52 is located inside the fixed portion 50 and inside the second guide portion 54 in the radial direction. In a case where the first guide portion 52 is viewed from the inside in the radial direction along the direction of the axis line of the cooling fluid supply hole 20 (that is, along the extension line C1 of the axis line C of the cooling fluid supply hole 20), the first guide portion 52 is provided to cover at least a portion of the cooling fluid supply hole 20 (substantially all of the cooling fluid supply hole 20 in the configuration shown in FIG. 5). That is, in a case where the first guide portion 52 is viewed from the inside in the radial direction along the direction of the axis line of the cooling fluid supply hole 20, the first guide portion 52 is provided to overlap at least a portion of the cooling fluid supply hole 20 (substantially all of the cooling fluid supply hole 20 in the configuration shown in FIG. 5). The first guide portion 52 is located on the extension line C1 of the axis line C of the cooling fluid supply hole 20 and includes a surface 56 intersecting the extension line C1 (in the example shown in FIG. 5, a surface 56 orthogonal to the extension line C1). The first guide portion 52 is provided to guide at least a portion of the cooling fluid, which has passed through the cooling fluid supply hole 20, along the surface 56 intersecting the extension line C1.

For example, as shown in FIG. 5, the plurality of turbine stator vanes 12 of the gas turbine 2 include a turbine stator vane 12A provided on the extension line C1 of the axis line C of the cooling fluid supply hole 20, and the first guide portion 52 is located between the turbine stator vane 12A and the cooling fluid supply hole 20 on the extension line C1. In addition, the first guide portion 52 is located between the heat shield plate 86 and the cooling fluid supply hole 20.

The second guide portion 54 has a cylindrical shape as described above and extends from the fixed portion 50 to the first guide portion 52 through the cooling fluid supply hole 20 along the direction of the axis line of the cooling fluid supply hole 20. A plurality of through-holes 60 are formed in an outer peripheral surface 58 of the second guide portion 54 inside the cooling fluid supply hole 20 in the radial direction. The plurality of through-holes 60 are arranged in a zigzag pattern in the outer peripheral surface 58. The plurality of through-holes 60 include a plurality of through-holes 60*a* and a plurality of through-holes 60*b*. The plurality of through-holes 60*a* are provided at the same position (first position) in the axial direction of the cylindrical shape of the second guide portion 54 at intervals in the circumferential direction of the outer peripheral surface 58. The plurality of through-holes 60*b* are provided at the same position (second position) in the axial direction of the cylindrical shape of the second guide portion 54 at intervals in the circumferential direction of the outer peripheral surface 58. The position where each of the through-holes 60*a* is provided and the position where each of the through-holes 60*b* is provided deviate from each other in the axial direction of the cylindrical shape of the second guide portion 54 and in the circumferential direction of the outer peripheral surface 58.

Hereinafter, some effects of the gas turbine cooling fluid guide 24B will be described.

In the configuration shown in FIG. 5, the cooling fluid supplied from the pipe 5 to the inside of the cylindrical second guide portion 54 in the cooling fluid supply hole 20 through the orifice 55 flows along the direction of the axis line of the cooling fluid supply hole 20 while being guided by an inner peripheral surface 59 of the cylindrical second guide portion 54 and hits the first guide portion 52 such that the direction of the flow is changed to a direction intersecting the axis line C of the cooling fluid supply hole 20. Then, the cooling fluid is ejected from the plurality of through-holes 60 (60*a* and 60*b*) in the outer peripheral surface 58 of the second guide portion 54. Therefore, it is possible to suppress the concentration of the cooling effect by the cooling fluid on the turbine stator vane 12 (particularly, the turbine stator vane 12A located on the extension line C1 of the axis line C of the cooling fluid supply hole 20) in the vicinity of the cooling fluid supply hole 20 and to suppress a variation in the cooling effect by the cooling fluid between the plurality of turbine stator vanes 12.

In addition, as in the configuration shown in FIG. 3, the first guide portion 52 is located between the heat shield plate 86 and the cooling fluid supply hole 20. Therefore, it is possible to suppress the collision of the cooling fluid (the cooling fluid which has passed through the inside of the second guide portion 54), which has passed through the cooling fluid supply hole 20, with the heat shield plate 86 of the turbine stator vane 12A on the extension line C1 and to suppress the damage to the heat shield plate 86 caused by the action of the large fluid force and fluid vibration on the heat shield plate 86.

Further, the fixed portion 50 of the gas turbine cooling fluid guide 24B is fixed to the turbine casing 10 instead of to the turbine stator vane 12. Therefore, even when the cooling fluid (the cooling fluid that has passed through the orifice 55) from the cooling fluid supply hole 20 collides with the first guide portion 52 of the gas turbine cooling fluid guide 24B, it is possible to suppress the transmission of a vibration to the heat shield plate 86 and to effectively reduce the risk of damage to the heat shield plate 86 caused by the vibration.

The present disclosure is not limited to the above-described embodiments and also includes modifications of the above-described embodiments and appropriate combinations of the modifications.

For example, in each of the gas turbine cooling fluid guides 24A and 24B shown in FIG. 3 and the like, the fixed portion 26 or 50 is fixed to the turbine casing 10 by the fixing members such as bolts. However, the fixed portion of the gas turbine cooling fluid guide may not be fixed to the turbine casing 10 and may be fixed only to the pipe 5 by the fixing members such as bolts.

For example, the content described in each of the above-described embodiments is understood as follows.

(1) According to at least one embodiment of the present disclosure, there is provided a gas turbine cooling fluid guide (for example, the gas turbine cooling fluid guide 24A or 24B) for guiding a cooling fluid of a gas turbine (for example, the gas turbine 2), the gas turbine including a plurality of turbine stator vanes (for example, the plurality of turbine stator vanes 12) and a turbine casing (for example, the turbine casing 10) which accommodates the plurality of turbine stator vanes and in which a cooling fluid supply hole (for example, the cooling fluid supply hole 20) for supplying the cooling fluid to the plurality of turbine stator vanes is formed, the gas turbine cooling fluid guide including: a fixed portion (for example, the fixed portion 26, 26*a*, 26*b*, or 50) that is fixed to either a pipe (for example, the pipe 5) for supplying the cooling fluid to the cooling fluid supply hole or the turbine casing; and a first guide portion (for example, the first guide portion 52) that is configured to cover at least a portion of an inside of the cooling fluid supply hole when viewed from an inside of the gas turbine in a radial direction along a direction of an axis line of the cooling fluid supply hole in a state in which the fixed portion is fixed to the pipe or the turbine casing.

According to the gas turbine cooling fluid guide described in (1), at least a portion of the cooling fluid that has passed through the cooling fluid supply hole flows along the direction of the axis line of the cooling fluid supply hole and hits the first guide portion such that the direction of the flow is changed to a direction intersecting the axis line of the cooling fluid supply hole. Therefore, it is possible to suppress the concentration of the cooling effect by the cooling fluid on the turbine stator vane in the vicinity of the cooling fluid supply hole (in particular, the turbine stator vane located on the extension line of the axis line of the cooling fluid supply hole) and to suppress a variation in the cooling effect by the cooling fluid between the plurality of turbine stator vanes.

In addition, according to the findings of the present inventors, in the gas turbine according to the related art, in a case where an accessory component (for example, a heat shield plate or the like) of a turbine stator vane is attached to an outer surface of an outer shroud in the radial direction, when the cooling fluid that has passed through the cooling fluid supply hole collides with the accessory component of the turbine stator vane, a large fluid force and fluid vibration act on the accessory component, and resonance may occur depending on the conditions. As a result, the accessory component may be damaged. In this respect, in the configuration according to (1), even in a case where the accessory component (for example, the heat shield plate or the like) of the turbine stator vane is attached to the outer surface of the outer shroud in the radial direction, the collision of the cooling fluid, which has passed through the cooling fluid supply hole, with the accessory component of the turbine stator vane can be suppressed by the first guide portion, and it is possible to suppress the damage to the accessory component caused by the action of the large fluid force and fluid vibration on the accessory component.

Further, in a case where the gas turbine cooling fluid guide is attached to the turbine stator vane instead of to the pipe or the turbine casing, even when the collision of the cooling fluid, which has passed through the cooling fluid supply hole, with the accessory component of the turbine stator vane is suppressed by the gas turbine cooling fluid guide, the vibration of the gas turbine cooling fluid guide is transmitted to the turbine stator vane and the accessory component. Therefore, there is a concern that the accessory component may be damaged due to the vibration.

In contrast, the fixed portion of the gas turbine cooling fluid guide is fixed to either the pipe or the turbine casing instead of to the turbine stator vane. Therefore, even when the cooling fluid from the cooling fluid supply hole collides with the gas turbine cooling fluid guide, the transmission of the vibration to the accessory component is suppressed, and it is possible to effectively reduce the risk of damage to the accessory component due to the vibration.

(2) In some embodiments, in the gas turbine cooling fluid guide according to (1), the plurality of turbine stator vanes include an on-extension-line turbine stator vane (for example, the turbine stator vane 12A) that is provided on an extension line (for example, the extension line C1) of the axis line (for example, the axis line C) of the cooling fluid supply hole, and the first guide portion is configured to be located between the on-extension-line turbine stator vane and the cooling fluid supply hole in a state in which the fixed portion is fixed to either the pipe or the turbine casing.

According to the gas turbine cooling fluid guide described in (2), the collision of the cooling fluid, which has passed through the cooling fluid supply hole, with the on-extension-line turbine stator vane can be suppressed by the first guide portion. Therefore, it is possible to suppress the concentration of the cooling effect by the cooling fluid on the on-extension-line turbine stator vane located on the extension line of the axis line of the cooling fluid supply hole and to effectively suppress a variation in the cooling effect by the cooling fluid between the plurality of turbine stator vanes.

(3) In some embodiments, in the gas turbine cooling fluid guide according to (2), the on-extension-line turbine stator vane includes an airfoil portion and an outer shroud that is connected to an outer end of the airfoil portion in the radial direction of the gas turbine, an accessory component of the turbine stator vane is attached to an outer surface of the outer shroud in the radial direction, and the first guide portion is configured to be located between the accessory component and the cooling fluid supply hole in a state in which the fixed portion is fixed to either the pipe or the turbine casing.

According to the findings of the present inventors, in a case where the accessory component (for example, the heat shield plate or the like) is attached to the outer surface of the outer shroud in the radial direction, when the cooling fluid that has passed through the cooling fluid supply hole collides with the accessory component of the on-extension-line turbine stator vane, a large fluid force and fluid vibration act on the accessory component, and resonance may occur depending on the conditions. As a result, the accessory component may be damaged. Therefore, as described in (3), when the first guide portion is located between the accessory component and the cooling fluid supply hole in a state in which the fixed portion is fixed to either the pipe or the turbine casing, it is possible to suppress the collision of the cooling fluid, which has passed through the cooling fluid supply hole, with the accessory component of the on-extension-line turbine stator vane and to suppress the damage to the accessory component caused by the action of the large fluid force and fluid vibration on the accessory component.

Furthermore, in a case where the gas turbine cooling fluid guide is fixed to the on-extension-line turbine stator vane instead of to either the pipe or the turbine casing, even when the collision of the cooling fluid, which has passed through the cooling fluid supply hole, with the accessory component of the on-extension-line turbine stator vane is suppressed by the gas turbine cooling fluid guide, the vibration of the gas turbine cooling fluid guide is transmitted to the on-extension-line turbine stator vane and the accessory component. Therefore, there is a concern that the accessory component may be damaged due to the vibration.

In contrast, the fixed portion of the gas turbine cooling fluid guide is fixed to either the pipe or the turbine casing instead of to the turbine stator vane. Therefore, even when the cooling fluid from the cooling fluid supply hole collides with the gas turbine cooling fluid guide, the transmission of the vibration to the accessory component is suppressed, and it is possible to effectively reduce the risk of damage to the accessory component due to the vibration.

(4) In some embodiments, in the gas turbine cooling fluid guide according to any one of (1) to (3), the first guide portion is formed in a plate shape, and the first guide portion is configured to include a surface (for example, the surface 35 or 56) that intersects an extension line (for example, the extension line C1) of the axis line of the cooling fluid supply hole in a state in which the fixed portion is fixed to the pipe or the turbine casing.

According to the gas turbine cooling fluid guide described in (4), the cooling fluid that has passed through the cooling fluid supply hole can be guided in a direction intersecting the extension line by the plate-shaped first guide portion. Therefore, it is possible to suppress the concentration of the cooling effect by the cooling fluid on the turbine stator vane in the vicinity of the cooling fluid supply hole (in particular, the turbine stator vane located on the extension line of the axis line of the cooling fluid supply hole) and to suppress a variation in the cooling effect by the cooling fluid between the plurality of turbine stator vanes.

(5) In some embodiments, in the gas turbine cooling fluid guide according to any one of (1) to (4), the first guide portion is located inside the fixed portion in the radial direction of the gas turbine in a state in which the fixed portion is fixed to the pipe or the turbine casing, and the gas turbine cooling fluid guide is configured to include a second guide portion (for example, the second guide portion 30, 30*a*, 30*b*, or 54) that extends outward in the radial direction from the first guide portion to the fixed portion in a state in which the fixed portion is fixed to the pipe or the turbine casing.

According to the gas turbine cooling fluid guide described in (5), the first guide portion can be held at a position inside the fixed portion in the radial direction of the gas turbine in a state in which the fixed portion is fixed to the pipe or the turbine casing.

(6) In some embodiments, in the gas turbine cooling fluid guide according to (5), the second guide portion is formed in a plate shape, and the second guide portion is configured to include a surface (for example, the surface 38 or 49 or the inner peripheral surface 59) that intersects an axial direction of the gas turbine in a state in which the fixed portion is fixed to the pipe or the turbine casing.

According to the gas turbine cooling fluid guide described in (6), the cooling fluid that has passed through the cooling fluid supply hole and collided with the first guide portion can be guided along the surface of the second guide portion intersecting the axial direction. Therefore, it is possible to suppress the concentration of the cooling effect by the cooling fluid on the turbine stator vane in the vicinity of the cooling fluid supply hole (in particular, the turbine stator vane located on the extension line of the axis line of the cooling fluid supply hole) and to suppress a variation in the cooling effect by the cooling fluid between the plurality of turbine stator vanes.

(7) In some embodiments, the gas turbine cooling fluid guide according to (1) further includes: an upstream-side second guide portion (for example, the second guide portion 30*a*) that extends from an upstream-side end portion (for example, the end portion 36) of the first guide portion in an axial direction of the gas turbine to an outside in the radial direction of the gas turbine in a state in which the fixed portion is fixed to the pipe or the turbine casing; and a downstream-side second guide portion (for example, the second guide portion 30*b*) that extends from a downstream-side end portion (for example, the end portion 37) of the first guide portion in the axial direction of the gas turbine to the outside in the radial direction of the gas turbine in a state in which the fixed portion is fixed to the pipe or the turbine casing, in which each of the upstream-side second guide portion and the downstream-side second guide portion is formed in a plate shape, and each of the upstream-side second guide portion and the downstream-side second guide portion is configured to include a surface (for example, the surface 38 or 39) that intersects the axial direction in a state in which the fixed portion is fixed to the pipe or the turbine casing.

According to the gas turbine cooling fluid guide described in (7), the cooling fluid that has passed through the cooling fluid supply hole and collided with the first guide portion can be guided to flow in the circumferential direction of the gas turbine between the surface of the upstream-side second guide portion that intersects the axial direction and the surface of the downstream-side second guide portion that intersects the axial direction. Therefore, it is possible to suppress the concentration of the cooling effect by the cooling fluid on the turbine stator vane in the vicinity of the cooling fluid supply hole (in particular, the turbine stator vane located on the extension line of the axis line of the cooling fluid supply hole) and to suppress a variation in the cooling effect by the cooling fluid between the plurality of turbine stator vanes.

(8) In some embodiments, in the gas turbine cooling fluid guide according to (5), the second guide portion is formed in a cylindrical shape, and the fixed portion includes a flange that is connected to an end portion (for example, the end portion 53) of the second guide portion.

According to the gas turbine cooling fluid guide described in (8), the cylindrical second guide portion can be inserted into the cooling fluid supply hole such that the flange is disposed on an entrance side of the cooling fluid supply hole and the first guide portion is disposed on an exit side of the cooling fluid supply hole. In addition, the cooling fluid can be guided to flow to the first guide portion along the direction of the axis line of the cooling fluid supply hole by the inner peripheral surface of the cylindrical second guide portion.

(9) In some embodiments, in the gas turbine cooling fluid guide according to (8), the flange includes an outer-peripheral-side flange portion (for example, the outer-peripheral-side flange portion 50*a*) that protrudes from the end portion of the second guide portion to an outer peripheral side in the cylindrical shape of the second guide portion and an inner-peripheral-side flange portion (for example, the inner-peripheral-side flange portion 50*b*) that protrudes from the end portion of the second guide portion to an inner peripheral side in the cylindrical shape of the second guide portion, and an orifice (for example, the orifice 55) that has a smaller diameter than the cooling fluid supply hole is formed in the inner-peripheral-side flange portion.

According to the gas turbine cooling fluid guide described in (9), the configuration according to (8) can be achieved with a small number of components, and a flow rate of the cooling fluid can be increased by the orifice.

(10) In some embodiments, in the gas turbine cooling fluid guide according to (8) or (9), a plurality of through-holes (for example, the plurality of through-holes 60, 60*a*, or 60*b*) are formed in an outer peripheral surface of the second guide portion.

According to the gas turbine cooling fluid guide described in (10), the cooling fluid that has passed through the cooling fluid supply hole and collided with the first guide portion is ejected from the plurality of through-holes in the outer peripheral surface of the second guide portion. Therefore, it is possible to suppress the concentration of the cooling effect by the cooling fluid on the turbine stator vane in the vicinity of the cooling fluid supply hole (in particular, the turbine stator vane located on the extension line of the axis line of the cooling fluid supply hole) and to suppress a variation in the cooling effect by the cooling fluid between the plurality of turbine stator vanes.

(11) In some embodiments, in the gas turbine cooling fluid guide according to (10), the plurality of through-holes include: a plurality of first through-holes (for example, the plurality of through-holes 60*a*) that are provided at intervals in a circumferential direction of the outer peripheral surface of the second guide portion at a first position in an axial direction of the cylindrical shape of the second guide portion; and a plurality of second through-holes (for example, the plurality of through-holes 60*b*) that are provided at intervals in the circumferential direction of the outer peripheral surface of the second guide portion at a second position in the axial direction of the cylindrical shape of the second guide portion.

According to the gas turbine cooling fluid guide described in (11), the cooling fluid that has passed through the cooling fluid supply hole and collided with the first guide portion is ejected from the plurality of first through-holes and the plurality of second through-holes in the outer peripheral surface of the second guide portion. This makes it possible to adjust the flow rate of the cooling fluid ejected from the second guide portion and to distribute an ejection position of the cooling fluid in the second guide portion in the axial direction and the circumferential direction of the cylindrical shape. Therefore, it is possible to suppress the concentration of the cooling effect by the cooling fluid on the turbine stator vane in the vicinity of the cooling fluid supply hole (in particular, the turbine stator vane located on the extension line of the axis line of the cooling fluid supply hole) and to suppress a variation in the cooling effect by the cooling fluid between the plurality of turbine stator vanes.

(12) According to at least one embodiment of the present disclosure, there is provided a gas turbine including: the gas turbine cooling fluid guide according to any one of (1) to (11); the turbine casing; and the plurality of turbine stator vanes.

According to the gas turbine described in (12), since the gas turbine cooling fluid guide according to any one of (1) to (11) is provided, it is possible to suppress the concentration of the cooling effect by the cooling fluid on the turbine stator vane (particularly, the turbine stator vane located on the extension line of the axis line of the cooling fluid supply hole) in the vicinity of the cooling fluid supply hole and to suppress a variation in the cooling effect by the cooling fluid between the plurality of turbine stator vanes.

REFERENCE SIGNS LIST

2 Gas turbine
4 Compressor
5 Pipe
5*a* Flange
6 Combustor
8 Turbine
9 Rotor (turbine rotor)
10 Turbine casing
10*b* Inner surface
10*a* Outer surface
12 Turbine stator vane
12A Turbine stator vane (on-extension-line turbine stator vane)
14 Flow path
15 Outer peripheral wall
16 Turbine rotor blade
20 Cooling fluid supply hole
24A, 24B Gas turbine cooling fluid guide
26, 26*a*, 26*b*, 50 Fixed portion
27, 42 Fixing member
28, 52 First guide portion
30, 30*a*, 30*b*, 54 Second guide portion
31, 34, 36, 37, 53, 57 End portion
32 End edge
33 Recess portion
35, 38, 39, 56 Surface (guide surface)
40, 55 Orifice
41 Orifice plate
50*a* Outer-peripheral-side flange portion
50*b* Inner-peripheral-side flange portion
58 Outer peripheral surface
59 Inner peripheral surface
60, 60*a*, 60*b* Through-hole
80 Airfoil portion
82 Outer shroud
83 Outer surface
84 Seal tube
85 Outer cavity
86 Heat shield plate
87 Top plate portion
88 Side wall portion

The invention claimed is:

1. A gas turbine cooling fluid guide for guiding a cooling fluid of a gas turbine, the gas turbine including a plurality of turbine stator vanes and a turbine casing which accommodates the plurality of turbine stator vanes and in which a cooling fluid supply hole for supplying the cooling fluid to the plurality of turbine stator vanes is formed, the gas turbine cooling fluid guide comprising:

a fixed portion that is fixed to either a pipe for supplying the cooling fluid to the cooling fluid supply hole or the turbine casing;

a first guide portion that is configured to cover at least a portion of the cooling fluid supply hole when viewed from an inside of the gas turbine in a radial direction along a direction of an axis line of the cooling fluid supply hole in a state in which the fixed portion is fixed to the pipe or the turbine casing;

an upstream second guide portion that is plate-like and is configured to extend from an upstream end of the first guide portion toward an outside in the radial direction so as to include a first surface intersecting an axial direction of the gas turbine and extending along a circumferential direction of the gas turbine in the state in which the fixed portion is fixed to the pipe or the turbine casing, the upstream end of the first guide portion being upstream in the axial direction of the gas turbine relative to a main flow of combustion gas of the gas turbine; and a downstream second guide portion that is plate-like and is configured to extend from a downstream end of the first guide portion toward the outside in the radial direction so as to include a second surface intersecting the axial direction of the gas turbine and extending along the circumferential direction of the gas turbine in the state in which the fixed portion is fixed to the pipe or the turbine casing, the downstream end of the first guide portion being downstream in the axial direction of the gas turbine relative to the main flow of combustion gas of the gas turbine.

2. The gas turbine cooling fluid guide according to claim 1, wherein the plurality of turbine stator vanes include an on-extension-line turbine stator vane that is provided on an extension line of the axis line of the cooling fluid supply hole, and the first guide portion is configured to be located between the on-extension-line turbine stator vane and the cooling fluid supply hole in the state in which the fixed portion is fixed to either the pipe or the turbine casing.

3. The gas turbine cooling fluid guide according to claim 1, wherein each of the turbine stator vanes includes an airfoil portion and an outer shroud that is connected to an outer end of the airfoil portion in the radial direction of the gas turbine, an accessory component of the turbine stator vane is attached to an outer surface of the outer shroud in the radial direction, and the first guide portion is configured to be located between the accessory component and the cooling fluid supply hole in the state in which the fixed portion is fixed to the pipe or the turbine casing.

4. The gas turbine cooling fluid guide according to claim 1, wherein the first guide portion is formed in a plate shape, and the first guide portion is configured to include a surface that intersects an extension line of the axis line of the cooling fluid supply hole in the state in which the fixed portion is fixed to the pipe or the turbine casing.

5. A gas turbine comprising:

the gas turbine cooling fluid guide according to claim 1;

the turbine casing; and the plurality of turbine stator vanes.

6. The gas turbine cooling fluid guide according to claim 1, wherein the upstream second guide portion extends along the circumferential direction such that a length along the circumferential direction is larger than a length of the cooling fluid supply hole along the circumferential direction when viewed along the direction of the axis line of the cooling fluid supply hole, and wherein the downstream second guide portion extends along the circumferential direction such that a length along the circumferential direction is larger than the length of the cooling fluid supply hole along the circumferential direction when viewed along the direction of the axis line of the cooling fluid supply hole.

7. The gas turbine cooling fluid guide according to claim 1, wherein the fixed portion includes a plate-like upstream fixed portion fixed to the turbine casing, and a plate-like downstream fixed portion fixed to the turbine casing at a downstream side in the axial direction of the gas turbine relative to the upstream fixed portion, and wherein a notch is formed at a downstream-side edge of the upstream fixed portion, the notch being recessed toward an upstream side and being configured such that a portion of the cooling fluid supply hole is located inside of the notch when viewed along the direction of the axis line of the cooling fluid supply hole.

* * * * *